March 9, 1943.                F. H. SHEPARD, JR                    2,313,096
REPRODUCTION OF SOUND FREQUENCIES
Filed April 17, 1940                    6 Sheets-Sheet 1
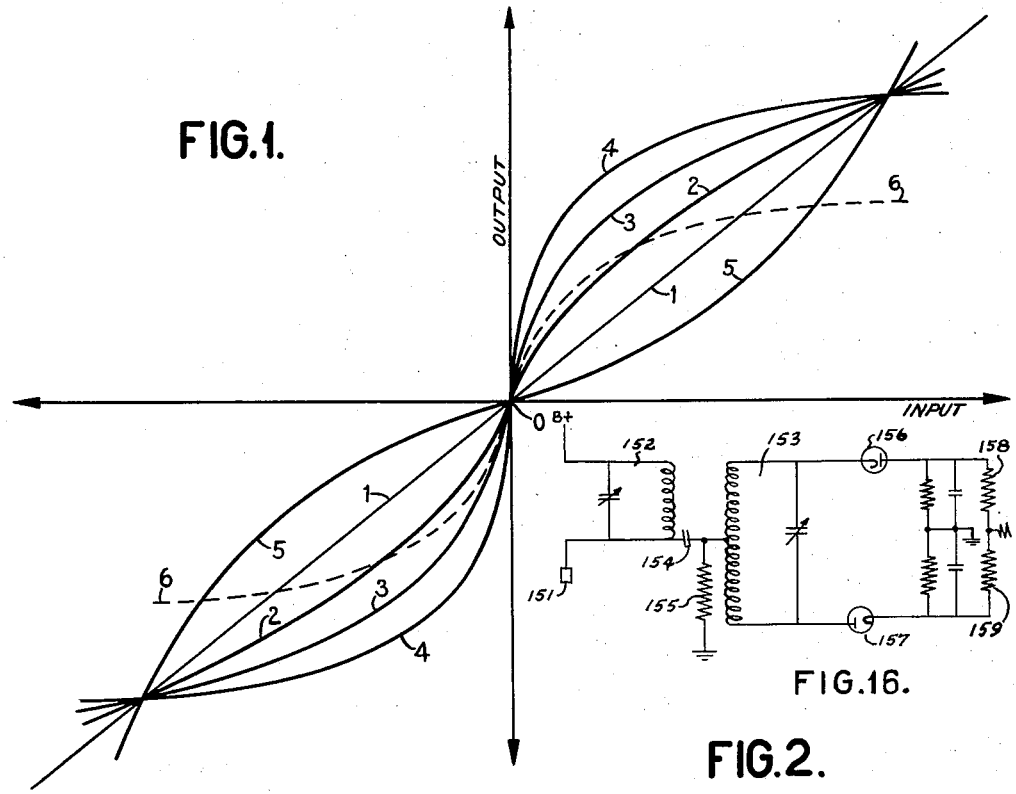
FIG.1.
FIG.16.
FIG.2.
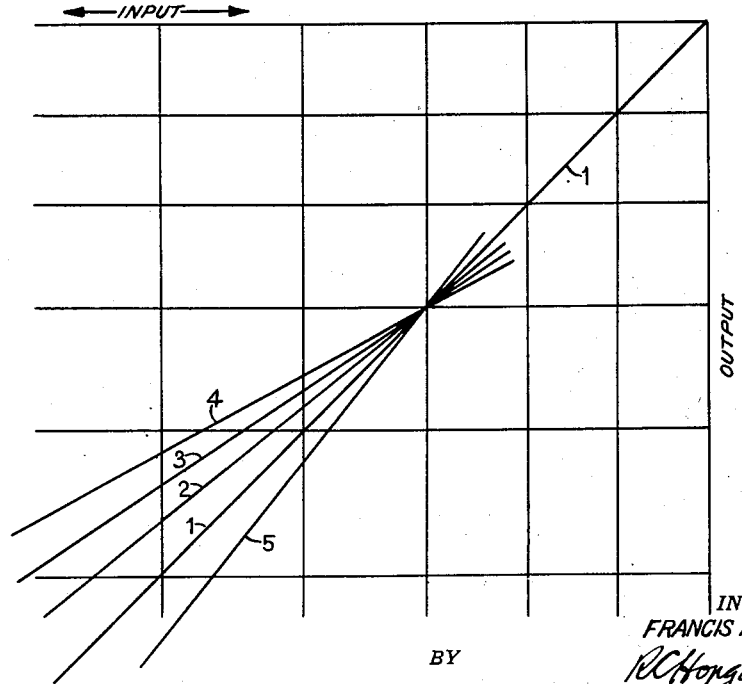
INVENTOR.
FRANCIS H. SHEPARD, JR.
BY
ATTORNEY.

March 9, 1943.   F. H. SHEPARD, JR   2,313,096
REPRODUCTION OF SOUND FREQUENCIES
Filed April 17, 1940   6 Sheets-Sheet 3

INVENTOR.
FRANCIS H. SHEPARD, JR
BY
R C Hopgood
ATTORNEY.

March 9, 1943.  F. H. SHEPARD, JR  2,313,096
REPRODUCTION OF SOUND FREQUENCIES
Filed April 17, 1940  6 Sheets-Sheet 4

INVENTOR.
FRANCIS H. SHEPARD, JR.
BY  RCHopgood
ATTORNEY.

March 9, 1943.   F. H. SHEPARD, JR   2,313,096
REPRODUCTION OF SOUND FREQUENCIES
Filed April 17, 1940   6 Sheets-Sheet 5

INVENTOR.
FRANCIS H. SHEPARD, JR.
BY
ATTORNEY.

March 9, 1943.  F. H. SHEPARD, JR  2,313,096
REPRODUCTION OF SOUND FREQUENCIES
Filed April 17, 1940  6 Sheets-Sheet 6
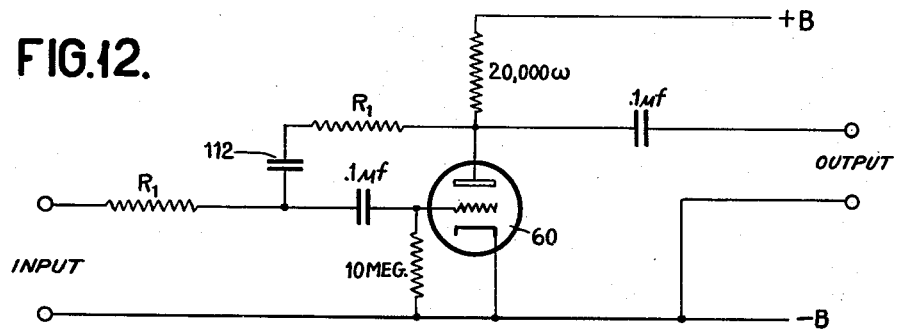
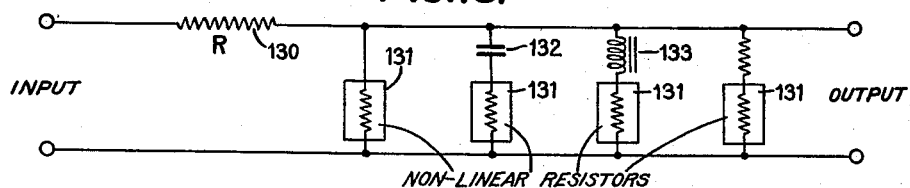
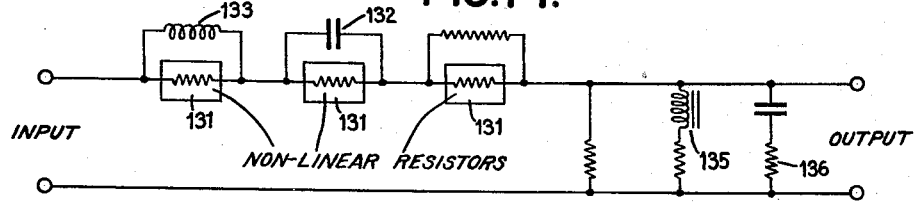
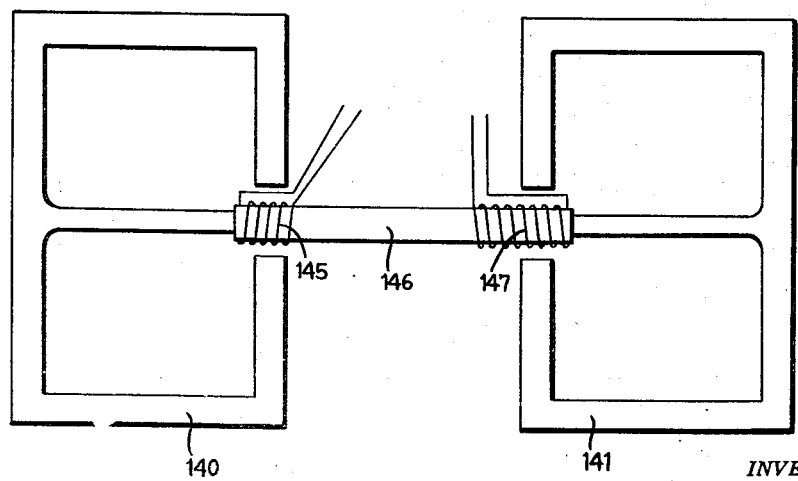
INVENTOR.
FRANCIS H. SHEPARD, JR
BY
RCHopgood
ATTORNEY.

Patented Mar. 9, 1943

2,313,096

UNITED STATES PATENT OFFICE 2,313,096

REPRODUCTION OF SOUND FREQUENCIES

Francis H. Shepard, Jr., Merchantville, N. J.

Application April 17, 1940, Serial No. 330,056

21 Claims. (Cl. 250—20)

My invention relates to amplifiers, and more particularly to new and improved methods for the amplification and/or the reproduction of sound frequency vibrations.

The present practice, when amplifying sounds, vibrations or impulses received by a microphone or other pick-up device, is to keep the amplification as distortionless as practicable. It is generally assumed that any distortion introduced by the amplifier is undesirable and great efforts are made to keep this distortion as low as possible. When the range of sound intensity that is desired to amplify is great, it is customary to monitor the gain either manually or automatically in such a manner that the distortion of the amplifier is kept as low as possible. Care is exercised to limit the rate of change in gain to avoid undesirable effects well known to those familiar in the art.

It is well known to those versed in the hearing art that a distortion is introduced into the sound signals somewhere between the ear drum and the brain. Curves showing this characteristic are shown in "Hearing" by Stevens and Davis, page 195, Fig. 82, published by John Wiley & Son, Inc., New York. This characteristic becomes practically a straight line within certain limits when plotted on logarithmic paper. Over the straight portion of this characteristic the curve can be approximately expressed by the equation $P_e=V^n$ where $P_e$ is sound pressure picked up by the ear, V is the voltage or stimulus to the brain and $n$ is an arbitrary exponent introduced by the hearing mechanism of the ear and generally greater than 1. It should be noted here that the exponent $n$ in the human ear is different for different frequencies, i. e., different wavefront steepnesses, in general in the human ear the exponent is greatest at frequencies in the order of 3000 cycles.

It is also generally recognized that the human ear has some sort of compensatory mechanism comparable to that of the eye, that causes the ear to be more sensitive in a quiet room than when in noisy surroundings. This accommodation of the ear takes place over a relatively long period of time compared to the rate of change of sound intensities. It may take a considerable time for the ear to reach its final state of accommodation for any one sound intensity level. The accommodation takes the form of a change of slope of a straight line plotted on the logarithmic scale, that is, a change which is roughly represented by a change in the value of the exponents $n$. The characteristic remains approximately straight over roughly the same range of V stimulus to the brain for all values $n$. It is also recognized in medical science that the sound sensitive mechanism of the ear is not directly sensitive to certain low frequencies, but that it responds to harmonics thereof. Accordingly, the presence of a frequency can be recognized by the brain even though the fundamental may be suppressed.

From the above discussion it can be seen that the brain is accustomed to interpreting a distorted wave or a stimulus and that it has trained itself to disregard or hear as natural this type of distortion. It should also be noted that the range of stimuli intensities received by the brain is considerably less than the range of sound pressures actually listened to.

The principal object of my invention is to predistort the waves representing sound vibrations in a manner similar to the distortions produced in the human ear. This may be accomplished by distorting the instantaneous amplitude of these waves to obtain a compression or expansion of the sound volume in a form similar to that produced directly in the human ear. The characteristics of the distorting means, preferably approximate, $V_m=P_e{}^q$, where $V_m$ is the sound pressure picked up by the microphone or other pick-up device, $P_e$ is the sound pressure fed to the ear and $q$ is an arbitrary exponent introduced by the distorting means.

The characteristic from the distorting device to the brain is practically expressed by $V_m=P_e{}^{nq}$, where $nq$ is a new overall exponent. As far as the brain is concerned, it apparently thinks that the new exponent is a result of an accommodation of the ear itself and so it is not conscious of the distortion introduced. Also, even though the range of sound intensities actually fed to the ear is considerably less than the range of sound intensities picked up by the microphone, the brain still feels or senses the original dynamic range. It should be noted here that the characteristics discussed are instantaneous and involve no time delay as in the conventional known systems of volume contraction and expansion.

In general this distortion effect is obtained by using a non-linear transducing device or combination of devices. In cases wherein the natural curvature of the device is not sufficiently great or suitable it can be modified by raising its first derivative to a power and utilizing the integral function of this resultant. This may be accomplished by utilizing an amplifier which itself may have a non-linear characteristic or may be operated in conjunction with other apparatus having non-linear characteristics. The non-linear characteristic in all cases should have a peaked derivative. It should be understood that this characteristic refers to the overall characteristic of the system and may be obtained by utilizing a combination of the various elements for its derivation.

My invention also has further application in making recordings on any medium or in transmitting signals over telephone lines, radio links, or other mediums where a limit to the dynamic range of signals it is possible to handle is controlled by the noise level on one hand and by the overloading, over-cutting or over modulation and the like of the same medium on the other hand. As above explained, if the proper type of distortion is introduced on these various types of apparatus, the range of signal intensities will be considerably less than the original range of wave intensities. However, as explained above when listening to sound the brain will not be conscious of the degree of dynamic range reduction that has taken place. Thus not only will the sensation of dynamic balance be present, but because of the frequency response characteristics of the hearing mechanism the low frequency components will also be sensed even though the actual low frequencies may not be radiated from the speaker.

In my invention a further object thereof comprises an arrangement to restore completely or in part the original character of the wave by making the play-back or reproducing system have the characteristics to correct for the distortion previously introduced, namely, the approximate characteristic $$R = P_e^{\frac{1}{q}}$$

where R is the signal level on the recording medium and $P_e$ and $q$ have the same significance as previously recited. It should be noted that even though the value of $q$ in the first part of the system differs from the value of $q$ in the reproducing system no harm is done because the resultant overall effect is $V_m = P_e^{q'}$ in which $q'$ will differ from unity and hence as explained above the type of distortion that is introduced will be unnoticed by the brain of the listener.

While I have discussed above certain objects of my invention in the manner in which it will operate, a clear understanding thereof may be obtained from the particular description of a few preferred embodiments thereof made in connection with the accompanying drawings, in which Figs. 1 to 5 are explanatory curves used to describe the operation of the device.

Figs. 6 to 11, inclusive, illustrate various embodiments of my invention utilizing an amplifier arrangement, and Figs. 12 to 14 illustrate other network systems for producing the results in accordance with my invention.

Fig. 15 shows a mechanical system for producing a desired distortion of input signals.

Fig. 16 shows a discriminator circuit designed to introduce the desired distortion of the audio frequency signal.

In Fig. 1 is illustrated a family of curves representing the general characteristics under discussion with the input plotted as abscissa and the output as ordinates. These curves all relate to equations wherein the input is proportional to the output raised to an exponent. The straight line curve 1 represents a power exponent of unity. Curves 2, 3, 4 and 6 represent the output raised to a power greater than unity and curve 5 represents the output raised to a power less than unity. These curves may be considered as roughly representing the response characteristics of the human ear and/or the response characteristics of the devices discussed in accordance with my invention.

Fig. 2 illustrates the curves of Fig. 1 drawn on a loglog scale representing only the portions in either the upper or lower quadrants illustrated in Fig. 1. It can be noted that all of the curves 1 to 5, inclusive, may be represented here as straight line curves between certain limits on the loglog scale, the difference in curvature being represented merely by variations in slope.

Figure 3:
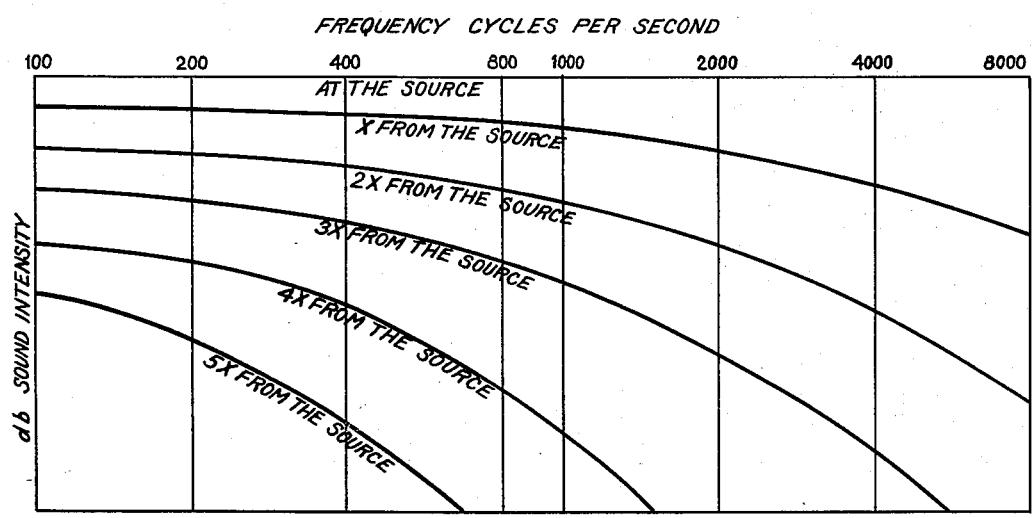

In nature it is well known that high frequency sounds are absorbed much more readily than low frequency sounds by foreign objects and by the hysteresis of the conducting medium itself. For this reason sounds having components at all frequencies will have one spectral characteristic at the source and many different spectral characteristics at different distances from the source. Fig. 3 illustrates approximately how the spectral characteristics of a sound change, as measured at various distances from the source.

Figure 4:
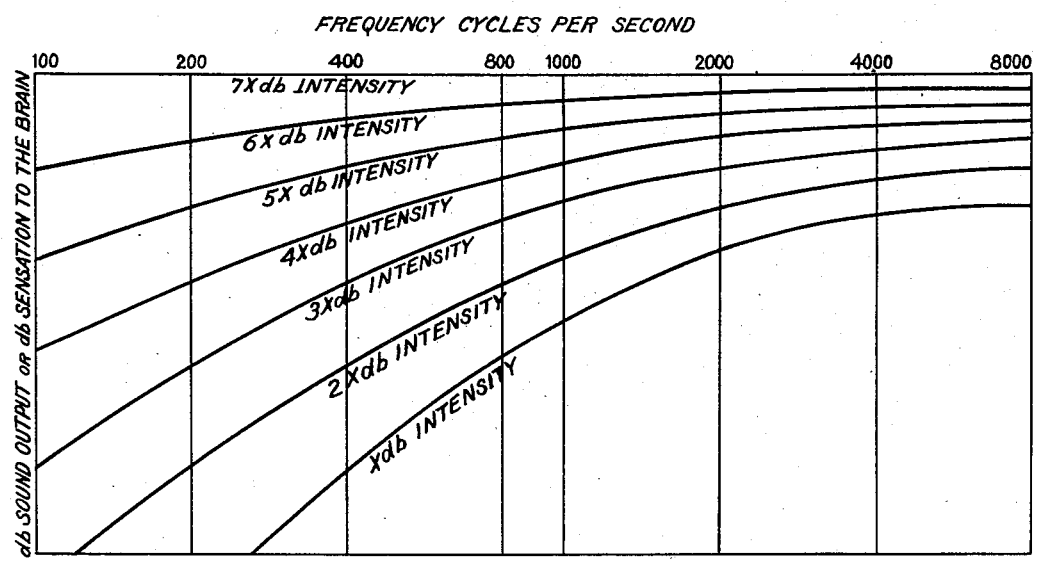

The human ear has a set of dynamic freqency response characteristics designed to compensate, in part, for this absorption phenomena. The set of curves shown in Fig. 4 show this characteristic plotted as frequency versus the translation to the brain for the various constant intensities. If input-output curves are plotted for particular frequencies, curves such as shown at 2, 3 and 4 of Fig. 1, will result. According to my invention I make the dynamic frequency response of a wave system from the input to the output have a characteristic somewhat as shown in Fig. 1 where all frequencies may or may not follow the same curve as shown in Fig. 1. In this way waves of various intensities may be weighted in frequency according to their intensity practically regardless of what other waves are passing through the system.

Figure 5:
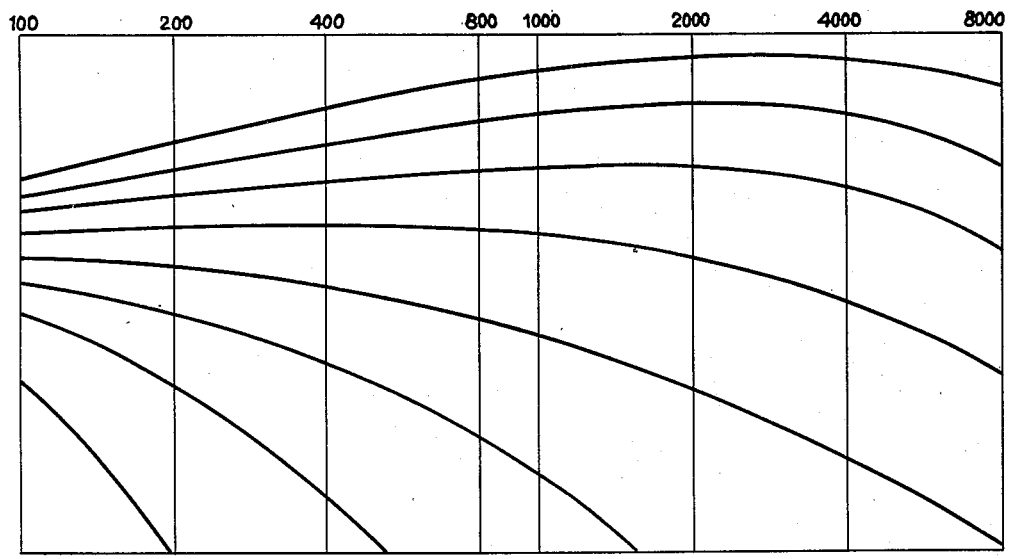

As a specific illustration of the selection of characteristics of an arrangement, Fig. 5 illustrates a plurality of curves plotting the output in decibels against the frequency in cycles per second for different inputs, applicable to radio receivers, public address systems, etc. The naturalness of the sound output from such systems remains relatively constant at all output levels. In Fig. 5 the instantaneous dynamic frequency characteristic it is desirable to have in a small radio receiver to make the timber correct at all sound level outputs are more specifically shown. It should be noted that the characteristics are instantaneous and apply simultaneously to high and low intensity sounds.

Figure 6:
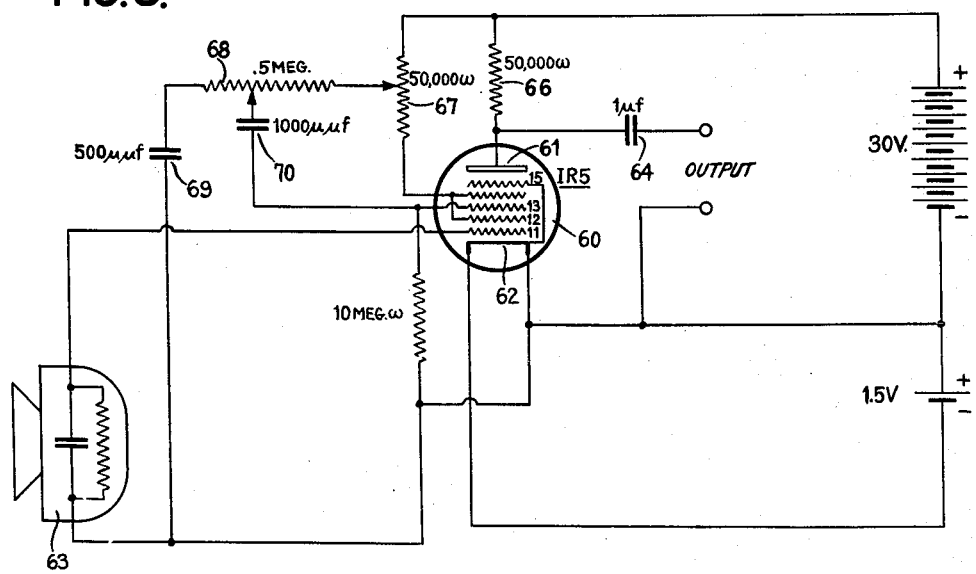

In Fig. 6 is illustrated a circuit embodiment of my invention using the non-linear characteristic of a conventional pentagrid convertor type tube, tube 60 having an anode 61 and a cathode 62. An input arrangement such as a microphone, for example, a crystal microphone, shown at 63 shunted by the conventional grid resistor is coupled between the cathode and input grid, the input grid of tube 60 and the output not shown is connected between the anode and cathode of the tube through a coupling condenser 64. The usual plate battery and cathode heating supply are shown, the plate supply being fed to the tube over the usual plate load, shown as resistor 66. A resistor 67 is connected between a voltage supply and screen grid 12 of tube 60, and is adjusted so that the mutual conductance of the tube is at a peak value. The mutual conductance between grids 12 and 13 is negative. A portion of the voltage drop across resistor 67 is fed back over a network comprising a voltage divider or potentiometer 68 and condensers 69 and 70 so as to apply this voltage between cathode 62 and grids 13 of the tube. The amount of feedback which is positive because the mutual conductance is negative may be adjusted by varying the tap on resistor 67 to control the amount of regeneration obtained. The character of the regeneration with regard to steepness of wave front may be adjusted by moving the tap on potentiometer 68.

In a demonstration hearing aid circuit according to Fig. 6, the following constants were used for the various elements, the plate voltage, 30 volts and a cathode supply was at 1.5 volts, resistances 66 and 67 were each of about 50,000 ohms, potentiometer 68 was 0.5 megohm, condenser 70 was .001 microfarad, and condenser 69 was .0005 microfarad. The leak resistance between grid 13 and the cathode was 10 megohms, the tube used was a pentagrid converter of the type known as an R. C. A. 1R5. This circuit gave a performance which was extremely good as a hearing aid amplifier under test, working in conjunction with the distortions in the human ear.

Figure 6A:
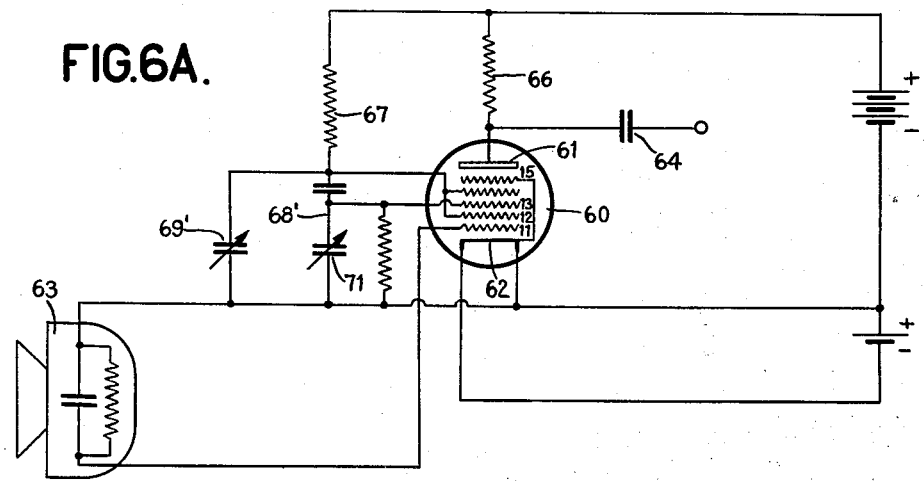

In Fig. 6A is shown an amplifier arrangement having a circuit connection essentially the same as that shown in Fig. 6. However, in this figure the condenser voltage divider consisting of 68 and 71 is used instead of the resistance potentiometer 67 and the voltage is adjusted by means of variable condenser 71. The frequency response of the feedback or the wavefront control is effected by means of a variable condenser 69' in place of the variable tap arrangement on potentiometer 68 of Fig. 6.

Figure 7:
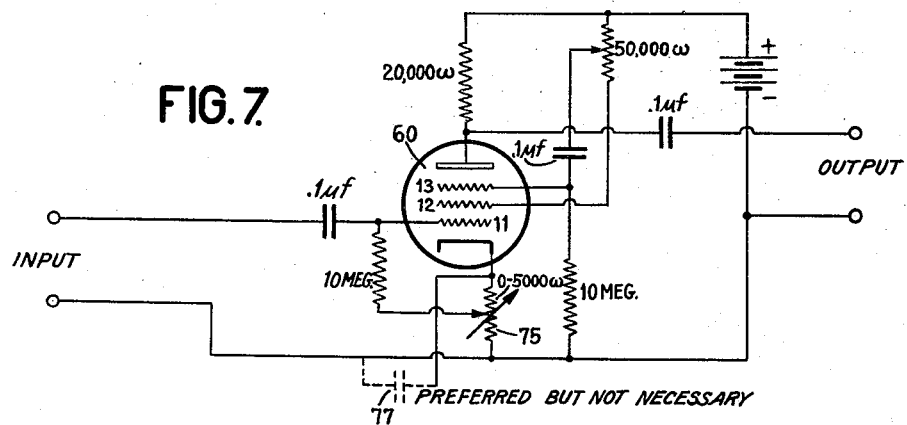

In Fig. 7 a further embodiment of my invention is disclosed utilizing a conventional pentode tube 60 which may be the type known as 6S7 having a negative trans-conductance between the screen and suppressor. This circuit is essentially the same as that shown in Fig. 6 with the necessary modification due to the different type of characteristic of the tube used. Accordingly, a resistor 75 may be introduced in the cathode of the cathode-grid 13 circuit to control the bias of this grid and grid 11 may be returned through a resistor to a tap on resistor 75, so that the tube may be readily adjusted to the center point of its characteristic curve. The alternating current component of the drop through resistor 75 is applied across the input circuit to grid 11 unless a by-passing condenser such as shown in dotted lines at 77 is supplied. In the general case this alternating current component may not be of sufficient magnitude to detrimentally effect the operation of the system. However, for the best operation and where practical, the by-pass condenser such as 77 should be supplied.

Figure 8:
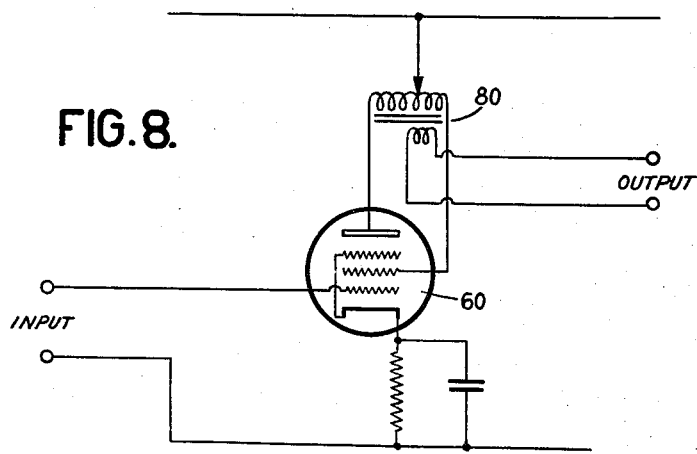

In the above discussion tubes having a negative transconductive characteristic between the feedback element, have been disclosed. While this system is generally more convenient because resistors which have very little phase shift characteristics may be used, it should be understood that other types of circuits may be used. For example, an arrangement such as shown in Fig. 8 may be utilized wherein the feedback voltage of a proper phase is supplied by a feedback transformer 80. While the feedback here is shown to a screen grid of the tube 60, it should be understood that the embodiment does not contemplate a limitation to such an arrangement. It is clear that the feedback could be made to any other elements of the tube. Alternatively in the showing of Fig. 8 instead of using a transformer for the output circuit of the tube a direct output connection to an output electrode can be made in a manner similar to that disclosed in the previously discussed figures.

In all of the embodiments discussed, if desired, the output may be further amplified by means well known in the art.

Figure 9:
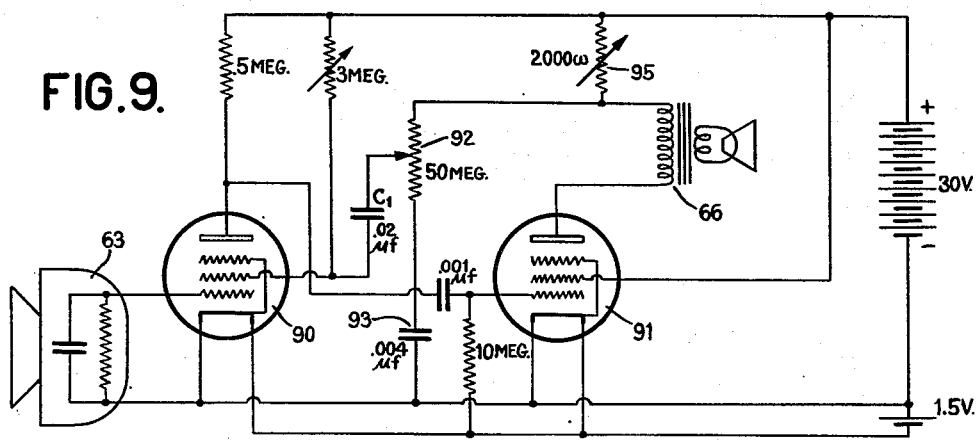

In Fig. 9 is illustrated an embodiment of my invention utilizing regeneration over more than one amplifier stage. In this system is shown the two-stage amplifier by way of illustration comprising vacuum tubes 90 and 91. The output load 66 is coupled across the output circuit of tube 91. The feedback potential is derived from the output circuit of tube 91 and is fed to the screen grid of tube 90. The variable network including 92 and condenser 93 serve to control the wavefront steepness response of the system as described in connection with the other figures. Variable resistor 95 controls the general amplitude of the feedback. The actual feedback is additionally controlled by the impedance of the output load 66. Accordingly, variations in the load impedance do not cause comparable variations in the voltage across the load. In other words, the variation in the feedback serves to compensate for impedance variations of the output load.

Figure 10:
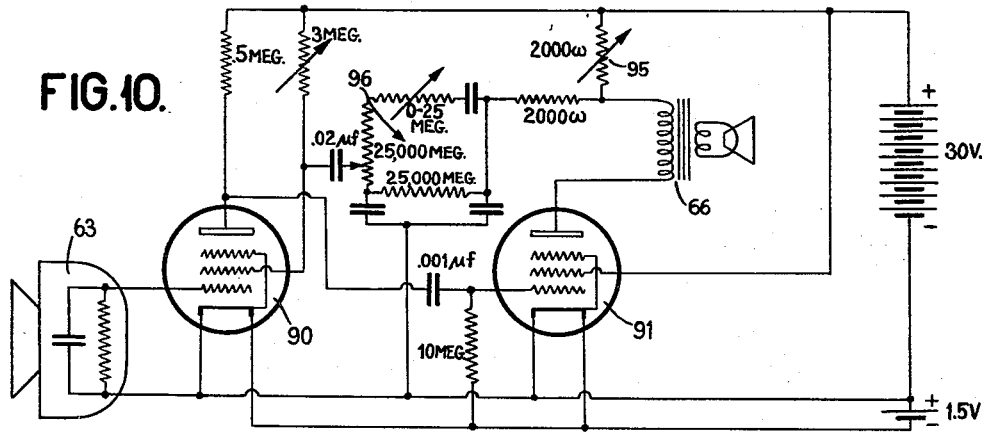

It should be noted that variations of the frequency discriminatory network adjustment cause variations of the losses which require a readjustment of resistor unit 95 in order that the characteristics of the system be maintained at the proper power function characteristic. To avoid the necessity of adjusting resistor 95 every time the frequency discrimination is altered, a compensating network arrangement such as shown in Fig. 10 may be supplied. Network 96 corresponds to the network of Fig. 9 comprising resistor condenser arrangements 92, 93. By this network 96 the quantity of feedback at different frequency adjustments can be kept substantially constant so that only a very slight readjustment may be required at 95.

Figure 11:
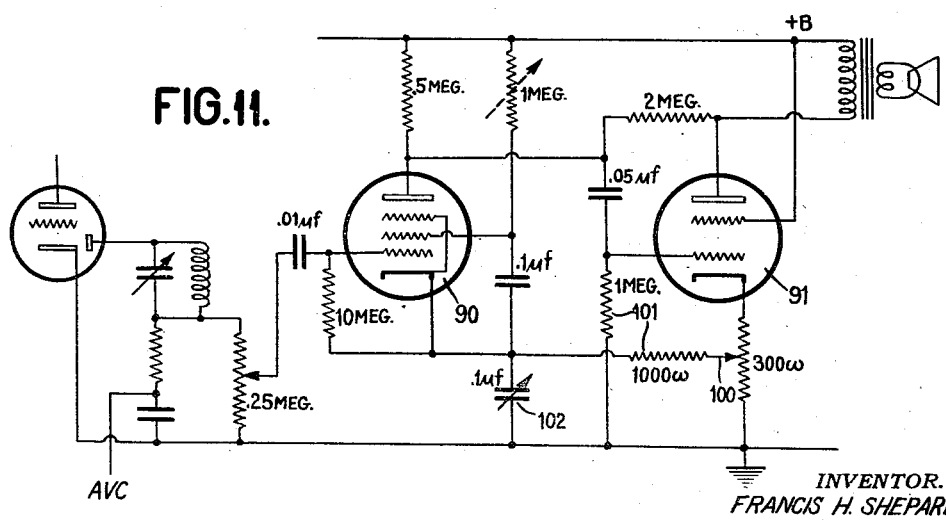

In the discussion of Figs. 9 and 10, an arrangement was shown wherein the feedback was introduced from the plate circuit to a grid circuit of the preceding stage. It is clear, however, that the feedback may be made between other electrodes of the tube. In Fig. 11 is illustrated a modification wherein the feedback is made between the cathode circuits of the tubes 90 and 91. This may be accomplished as shown in Fig. 11, by providing a variable tap 100 on the normal cathode bias resistor of the output tube. The potential drop developed across this resistor between the cathode to ground and the tapping point is fed back between the cathode and grid of the preceding amplifier tube 90. A frequency discrimination network comprising resistor 101 and variable condenser 102 is provided for adjusting the wave front steepness response. In the arrangement of Fig. 11 instead of a microphone the conventional output circuit of a radio receiver detector is illustrated connected to the input of the system. It should be understood, however, that in this circuit as well as the other discussed, any suitable source of signal vibrations may be used.

It should also be understood that the feedback voltage can be derived from the secondary of the output transformer, for instance, the voltage across the voice coil, or the voltage drop across a resistor which may be non-linear in series with the voice coil. In the latter instance, as explained above, speaker resonances will be damped.

In Fig. 11 a degenerative feedback is also provided about tube 91, in connection with the regenerative feedback over a greater part of the amplifier. This degenerative feedback serves to suppress peak voltages that otherwise might appear in the amplifier output because of the output load and/or tube characteristics, for example speaker resonance, and results in an improved overall performance.

In all of the specific examples discussed above, systems have been shown utilizing vacuum tube arrangements which inherently possess peaked first derivative characteristics. It should be understood, however, that where this peaking is not pronounced enough or is not present the effect can be supplied by utilizing external non-linear elements. In Fig. 12 is illustrated a system utilizing such a non-linear arrangement. In Fig. 5 vacuum tube 60 is shown as a triode although it is clear that the principles of this arrangement apply equally to other types of tubes such as tetrodes, pentodes, etc. As shown in Fig. 12 the effectively linear characteristic of tube 60 is properly modified by providing a feedback connection through a non-linear element $R_1$ over blocking condenser 112 which serves to prevent the D. C. altering the characteristic or biasing the characteristic of $R_1$. Non-linear device $R_1$ may comprise any desired element. For example, it may comprise a carborundum compound known under the trade name of "Thyrite," a saturable reactor arrangement, a certain powdered iron compound, contact rectifiers or electrolytic devices, or many other types of elements known to those skilled in the art. The value of the effective exponent can be controlled by the characteristic of the non-linear impedance element used, in addition to the amount of degeneration or regeneration.

While in Fig. 12 I have illustrated an arrangement utilizing a degenerative feedback it should be understood that the same principle may be applied utilizing a non-linear element in regenerative circuits. Furthermore, it should be distinctly understood that this use of non-linear resistor arrangement as discussed in connection with Fig. 12 may be used in various circuits such as shown in the previously discussed figures either by itself in place of the feedback arrangement and non-linear tube elements shown, or in combination therewith to obtain the desired characteristics.

In the above discussions I have mentioned particularly devices operating as straight amplifier or transducing devices. It should be understood that the characteristic can be introduced as a modulation function, for instance. In a radio receiver the desired distortion can be introduced by suitably feeding back audio voltage into one of the gain control grids or elements in the R. F. or I. F. part of the receiver.

In frequency modulation receivers it is possible to design the part known as the discriminator or detector, to introduce the desired distortion of the audio signal, so that the output plotted against frequency assumes the desired curvilinear form.

While in my above discussion I have considered only non-linear devices in connection with amplifiers, it should be understood that non-linear elements may be used by themselves singly or in combination to obtain a desired distorted output characteristic. Such arrangements are illustrated in Figs. 13 and 14.

In Fig. 13 is shown a transmission arrangement wherein the input signals are suitably distorted in accordance with the teachings of my invention. This distortion is accomplished by a fixed resistor 130, is part of a potential dividing network, the other part of which comprises one or more non-linear elements 131, whose effectiveness in the circuit may be altered by the impedance elements used in conjunction therewith. The frequency discrimination may be accomplished by utilizing reactive impedances such as condenser 132 or inductance 133. It should further be understood that if desired some of the elements, such as 131, may be included in series in the line with resistor 130 to secure a different control effect. Element 131 may be of the same general type as those described in Fig. 12.

In Fig. 14 an embodiment wherein the fixed resistor is arranged in a shunt line and the signal is fed in series through non-linear devices 131, shunted by the frequency discriminatory mechanisms. In this arrangement it may be desirable that some impedance device, either frequency discriminatory or not, be bridged across the elements 131 in order that the circuit characteristic will be properly attained. Further frequency discrimination may be obtained by shunting reactance elements across the transmission circuit as shown at 135, 136.

In this figure, as well as in Fig. 13, the nature of the non-linear elements may be substantially the same as those discussed and outlined specifically in the description of Fig. 12.

A further embodiment of my invention contemplates the obtaining of the desired distortion by mechanical or electro-mechanical means. One embodiment of such a system is illustrated in Fig. 15. Two dynamic magnetic structures 140 and 141, such as used in conventional dynamic speakers, are illustrated. These magnetic structures may be permanent magnets or electro-magnets or devices. In this arrangement the coil 145 associated with magnet 140 may be wound linearly with respect to supporting cylinder 146 so that variations of current supplied to coil 145 produce a linear motion of rod 146. On the other end of rod 146 is provided a coil 147 mounted between the pole pieces of magnet 141. The distribution of the winding to coil 147 or the shape of the pole pieces of magnet 141, or both, may be adjusted to produce the desired output characteristic curve for the energy produced in coil 147. Although one side was described as being linear it is clear that the desired characteristic can be obtained by distorting either or both sides of the device.

It is clear that the output mechanism may take other forms than that illustrated in Fig. 15. For example, the output mechanism may take the form of a speaker cone mechanically driven by moving coil 145 which coil is wound in conjunction with the pole pieces to impart the desired non-linear characteristic to the moving element.

It is also clear that other devices, as for example diaphragm or movable armature type systems, may be utilized to obtain the desired characteristic in a manner somewhat similar to that discussed in connection with Fig. 15.

I have mentioned above that in frequency modulation receivers, it is possible to design the part known as the discriminator or detector to introduce the desired distortion of the audio signal so that the output plotted against the input (frequency) assumes the desired curvilinear form. This is illustrated in Figure 16 in which I have shown diagrammatically a conventional frequency modulation detector having an anode 151 to represent the anode of a radio frequency or intermediate stage feeding into a frequency discriminator or detector in a frequency moduuation system, and in which there are two tuned circuits 152 and 153 each tuned to the same frequency which is by the radio or intermediate frequency supplied by the anode 151. The circuit of anode 151 is coupled through condenser 154 and resistance 155 and also inductively through the mutual inductance of circuits 152 and 153 so that voltages appearing on the diodes 156 and 157 are determined by the vectorial sum of the voltages across circuit 152 and across the parts of circuit 153 in a manner well known to those familiar with the art. There is a phase rotation of the voltages appearing across circuit 152 and across circuit 153 as the frequency of the signal is varied. As the phase rotates and the vectorial sum of the voltages applied to the diodes 156 and 157 varies in a differential manner, the output voltage taken from the resistor network 158 and 159 is such that it represents the voltage difference between the outputs of the two diodes. The curve of frequency versus instantaneous output over a range of frequencies (when the parameters of coupling, etc., are properly adjusted) can be made to approximate the desired non-linear input output characteristic as described above. In other words, as stated above, the circuit of Figure 16 as a circuit is a conventional frequency modulation detector circuit but by controlling coupling, circuit losses, etc., it can be adjusted to give a distorted characteristic over a limited but sufficient range to accomplish the purpose of my invention.

While I have described my invention in connection with certain specific embodiments thereof, it should be distinctly understood that this description is made merely by way of illustration and is not to be construed as any limitation of the scope thereof. Furthermore, while I have described in connection with each amplifier arrangement a particular type of tube, it is clear that in any of the systems disclosed different types of tubes may be substituted, it being merely necessary to care for the various characteristics of the tube by suitably modifying the circuit. Furthermore, many other circuits and designs not specifically discussed, for accomplishing the results in accordance with my invention, will occur to those skilled in the art. What I consider to be my invention and upon which I desire to secure protection is embodied in the accompanying claims.

What I claim is:

1. A system for conveying waves representing sound frequency vibrations to a responsive indicator in sound compensatory distorted form, comprising a means for transferring said waves and means for distorting the amplitude of said waves in said transferring means to give them an instantaneous output amplitude equal to an effective power function of the wave level at the input, said distorting means being adjusted to give a distortion approximating that imparted by the normal human ear.

2. The method of conveying sounds to the ear in compensatory distorted form which comprises, transferring sound waves, and giving to said waves a distortion such that the instantaneous pressure produced by said waves is expressed as an approximate power function of the original sound pressure, said distortion approximating that imparted by the normal human ear.

3. The method of distorting waves representing sound frequency vibrations in a manner similar to the distortion produced in the human ear, which comprises distorting the instantaneous amplitude of said waves to obtain compression or expansion of the sound volume in a form similar to that of the normal human ear.

4. A system for obtaining a substantial power function of a wave including a device having a non-linear characteristic with a peaked derivative comprising means for raising said derivative by an exponent, and means for obtaining therefrom a resultant integral function.

5. A system according to claim 4 wherein said wave has a wave front variable in steepness and wherein said first named means comprises means for raising said derivative by an exponent dependent upon said wave front steepness.

6. A system according to claim 4 wherein said first named means comprises an amplifier and said means for raising said derivative by an exponent comprises a feedback circuit.

7. A system according to claim 4 wherein said first named means comprises an amplifier and said means for raising said derivative by an exponent comprises a regenerative feedback circuit.

8. A system according to claim 4 wherein said first named means comprises an amplifier, and said means for raising said derivative by an exponent comprises a degenerative feedback circuit having a non-linear characteristic.

9. A system for conveying waves representing sound frequency vibrations to a responsive indicator, comprising a circuit having an input and an output, means for applying to said input waves representing sound frequency vibrations, a responsive indicator coupled to said output and means interposed between said input and output for distorting said input waves to give them an instantaneous output amplitude proportional to an approximate power function of the type produced by the normal human ear of the instantaneous wave level at the input.

10. A system according to claim 9, wherein said last named means comprises a device having a peaked derivative, means for raising said derivative by an exponent, and means for obtaining therefrom a resultant integral function.

11. A system according to claim 9, wherein said last named means comprises an amplifying device, and means for feeding back a portion of the output energy of said amplifying device to the input to obtain the desired instantaneous output wave form.

12. A system according to claim 9 wherein said last named means comprises an amplifying device and non-linear means for feeding back a portion of the output energy of said amplifying device to the input thereof.

13. A system according to claim 9 wherein said last named means comprises an amplifying device and non-linear means for feeding back in negative phase a portion of the output energy of said amplifier to the input thereof.

14. A system according to claim 9, wherein said last named means comprises a non-linear impedance device.

15. A system according to claim 9 wherein said last named means comprises a potential divider, having at least two parts, non-linear means in at least one part of said voltage divider, and means for coupling said output across one of said parts.

16. A system according to claim 9 wherein said last named means comprises a voltage divider having at least two parts, non-linear conductive means and frequency discriminating means in at least one of said parts, means for coupling said input across both parts of said voltage divider and means for coupling said output across one part of said voltage divider.

17. A system according to claim 9, wherein said circuit comprises an amplifier for amplifying modulated waves, and said last named means comprises a detector having a suitably curved characteristic.

18. A system according to claim 9 wherein said last named means comprises an amplifying device and means for feeding back in positive phase a portion of the output energy of said amplifier to the input thereof.

19. A system for conveying waves representing sound frequency vibrations to a responsive indicator comprising a transducer device having input and output circuits, means for applying to said device waves representing sound frequency vibrations, a responsive indicator in said output circuit, means for feeding back energy from said output to said input, and means in said system for distorting said input waves to give them an instantaneous output amplitude proportional to an approximate power function of the type normally produced by the normal human ear, of the instantaneous wave level at the input.

20. A system for conveying waves representing sound frequency vibrations to a responsive indicator comprising a non-linear transducer device having input and output circuits, means for applying to said device waves representing sound frequency vibrations, a responsive indicator in said output circuit and means for feeding back energy from said output to said input, said non-linear transducer means distorting said input waves to give them an instantaneous output amplitude proportional to an approximate power function of the type normally produced by the normal human ear, of the instantaneous wave level at the input.

21. A system for conveying waves representing sound frequency vibrations to a responsive indicator comprising a substantially linear transducer device having input and output circuits, means for applying to said device waves representing sound frequency vibrations, a responsive indicator in said output circuit, and non-linear means for feeding back energy from said output to said input, said last named means distorting said input waves to give them an instantaneous output amplitude proportional to an approximate power function of the type normally produced by the normal human ear, of the instantaneous wave level at the input.

FRANCIS H. SHEPARD, Jr.